United States Patent [19]
Ha

[11] Patent Number: 6,054,834
[45] Date of Patent: Apr. 25, 2000

[54] CONTROL SYSTEM FOR A STEP MOTOR AND METHOD THEREOF

[75] Inventor: Jong-Ho Ha, Kyonggi-do, Rep. of Korea

[73] Assignee: SamSung Electronics Co., Ltd., Kyungki-do, Rep. of Korea

[21] Appl. No.: 09/198,404

[22] Filed: Nov. 24, 1998

[30]    Foreign Application Priority Data

Nov. 24, 1997  [KR]  Rep. of Korea ................... 97-62332

[51] Int. Cl.[7] ........................................... G05B 19/40
[52] U.S. Cl. ................................. 318/685; 318/696
[58] Field of Search ................................. 318/685, 696

[56]              References Cited
               U.S. PATENT DOCUMENTS

| | | | |
|---|---|---|---|
| 3,766,458 | 10/1973 | Nishimura et al. | 318/313 |
| 3,914,051 | 10/1975 | Crawley | 356/2 |
| 4,618,808 | 10/1986 | Ish-Shalom et al. | 318/696 |
| 4,818,908 | 4/1989 | Tamae et al. | 310/171 |
| 4,884,016 | 11/1989 | Aiello | 318/685 |
| 5,220,464 | 6/1993 | Lin | 359/885 |

*Primary Examiner*—Robert E. Nappi
*Assistant Examiner*—Rina I. Duda
*Attorney, Agent, or Firm*—Robert E. Brushnell, Esq.

[57]              ABSTRACT

A control system of a step motor and a method thereof are capable of evenly maintaining a traveling distance and a torque in a moving section, especially in an accelerating section, by limiting a start excitation phase or a final stop phase to a specific phase, even though an excitation and the torque are unevenly generated due to an imbalance in a step angle generated during the manufacturing and/or assembly of the step motor.

22 Claims, 6 Drawing Sheets

| Step | Excitation state of phase A | Excitation state of phase B | Combined torque |
|---|---|---|---|
| 0 | + | + | A+B |
| 1 | + | − | A−B |
| 2 | − | − | −(A+B) |
| 3 | − | + | −(A−B) |
| 4 | + | + | A+B |

CONTROL SYSTEM FOR A STEP MOTOR AND METHOD THEREOF

CLAIM OF PRIORITY

This application makes reference to, incorporates the same herein, and claims all benefits accruing under 35 U.S.C. §119 from an application for CONTROL SYSTEM OF A STEP MOTOR AND METHOD THEREOF earlier filed in the Korean Industrial Property Office on the 24th of November 1997 and there duly assigned Serial No. 62332/1997.

BACKGROUND OF THE INVENTION

1. Technical Field

The present invention relates to a control system for a step motor and a method thereof More particularly, the invention relates to a control system for a step motor and method thereof capable of evenly maintaining a traveling distance and a torque in a moving section, especially in an accelerating section, by limiting a start excitation phase or a final stop phase to a specific phase, even though an excitation and the torque are unevenly generated due to imbalance of a step angle generated during manufacturing and assembly of the step motor.

2. Related Art

A step motor is used to achieve precision in traveling distance when feeding paper to a printer or when moving a carriage equipped with a print head.

However, that objective is not always achieved in present systems. Specifically, under certain conditions or circumstances described in more detail below, the traveling distance in an acceleration portion of the step motor process is different between first and second lines of printing. As a result, in a unidirectional printing operation, the start position of a uniform speed period becomes different by a certain amount. This causes problems in the operation of the step motor and printer.

SUMMARY OF THE INVENTION

Therefore, it is an object of the present invention to provide an apparatus and a method for accurately aligning first print positions of each line by constantly maintaining start phases even though step angles of phases A and B do not maintain 90° with respect to each other due to problems which occur in manufacturing and assembling the step motor.

According to one aspect of the present invention, a system for controlling a step motor includes a position detector for detecting the position of the step motor; a phase detector for detecting the phase of the step motor; a step motor control unit for controlling the start and stop operations of the step motor to be performed in specific phases based on the position of the step motor detected by the position detector and the phase detected by the phase detector; and a step motor driving unit for driving the step motor by a driving signal of the step motor control unit.

According to another aspect of the present invention, the step motor control unit stores a target movement of a step and preferred excitation states of each phase for start and stop times, and then detects a stop state. Afterwards, the step motor control unit compares the excitation state of the stop time with the stored excitation states of each phase of the stop time. When they do not matched each other, the target movement of the step is properly controlled.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Figure 1:
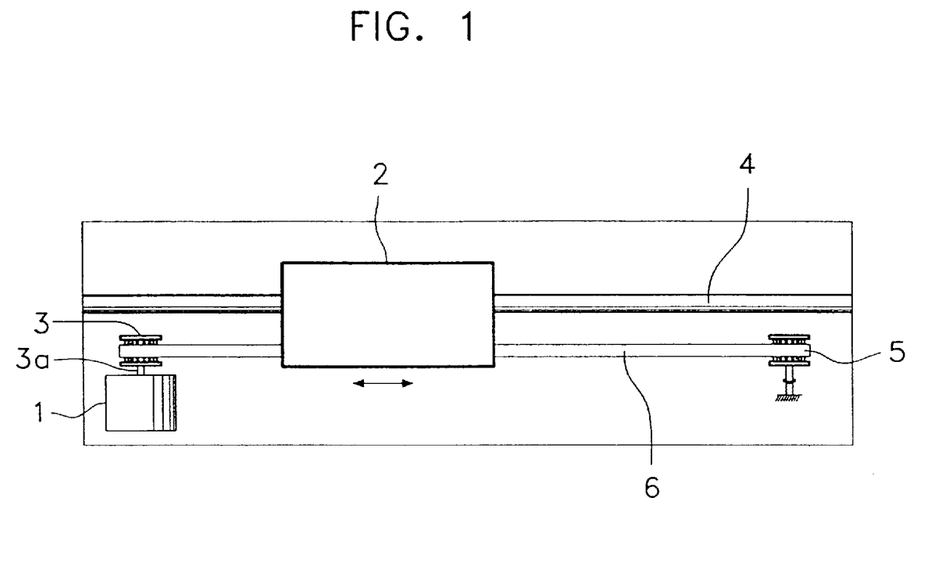
FIG. 1 is a schematic view illustrating a driving unit of a shuttle type printer.

FIG. 1 is a schematic view illustrating a driving unit of a shuttle type printer.

As shown in the drawing, a driving pulley 3 is connected to a rotary shaft 3a of the step motor 1 which generates a torque. The rotating force of the driving pulley 3 is transmitted to a driven pulley 5 through a driving belt 6. A printer unit 2 equipped with the print head (not shown) in printer unit 2 is transported as the driving belt 6 moves. The printer unit 2 is moved along a guide rail 4.

When the printer unit 2 is transported per unit of line in the printer driving unit, the traveling speed of the step motor 1 can be divided into an acceleration period (representing movement from start to a predetermined speed), a uniform speed period, and a deceleration period (representing movement to a stop). In order to obtain a required shape of a letter, the printing operation performed by a print head (not shown) within the printer unit 2 is achieved during the uniform speed period.

Since positions for printing first letters of each line must be the same when the torque during the acceleration period is uniform in each line, the same torque is required in each line of the acceleration period.

However, when an error in the step angles occurs in manufacturing or assembling the step motor, a speed difference is generated per unit of line, during the acceleration period, and an error occurs in the start printing position.

Figure 2:
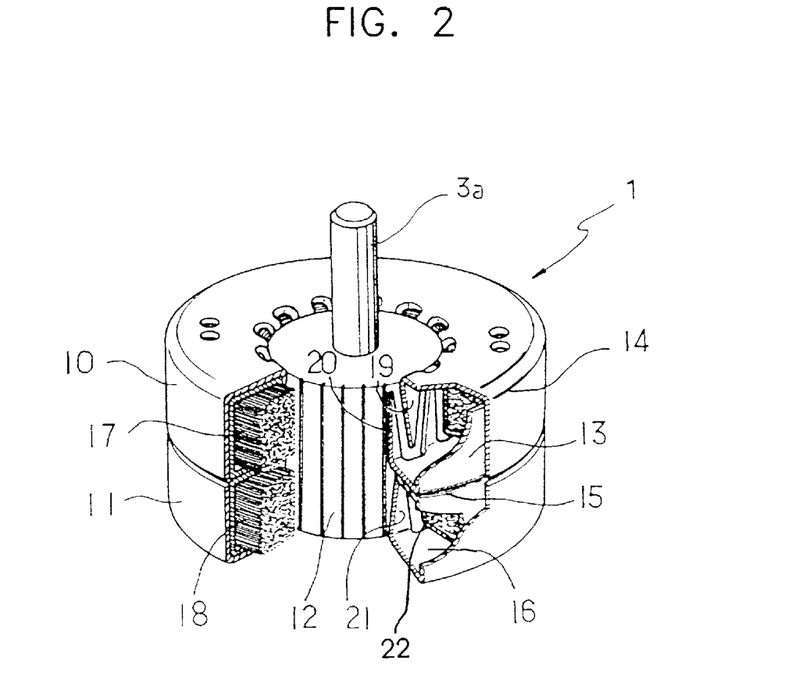
FIG. 2 is a cutaway perspective view illustrating the structure of a two-phase, permanent magnet type step motor.

FIG. 2 is a cutaway perspective view illustrating the structure of a two-phase, permanent magnetic type step motor.

In the outer peripheral surface of a cylindrical rotor 12, N and S poles are magnetized alternatively along its circumference. The rotary shaft 3a is arranged along the central axis of the rotor 12, and the end of the rotary shaft 3a is fixed by a bearing (not shown).

Each of a first stator 10 and a second stator 11 has a cylindrical shape. The rotor 12 is inserted into an empty space inside the first stator 10 and second stator 11. An air gap is formed between the rotor 12 and stators 10 and 11.

The first stator 10 comprises an upper plate 14 and a lower plate 13 made of a material having high permeability. At the side of the upper plate 14 facing the permanent magnet of the rotor 12, hatched shaped inducers 19 are formed in the downward direction along the circumference. In addition, at the side of the lower plate 13 facing the permanent magnet of the rotor 12, hatched inducers 20 are formed in the upward direction. Each inducer 20 is located between a pair of inducers 19, and vice-versa. Moreover, a first excitation coil 17 is wound around the internal space between the upper plate 14 and lower plate 13.

The second stator 11 has the same shape. At the surfaces of an upper plate 15 and a lower plate 16 facing the rotor 12, hatched inducers 22 and 21, respectively, are formed, and they are geared into each other. In addition, a second excitation coil 18 is wound around the internal space between the first upper plate 15 and lower plate 16.

Figure 3:
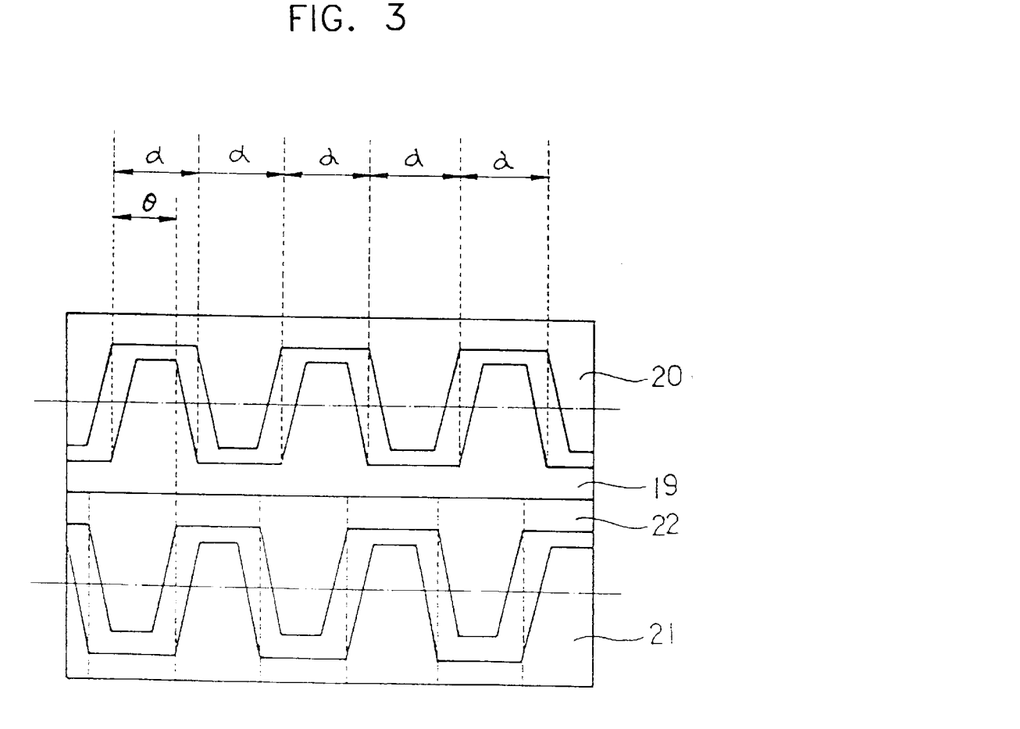
FIG. 3 is a development figure illustrating inducers formed at a first stator and a second stator.

FIG. 3 is a development figure illustrating the inducers formed at the first stator and the second stator.

As shown in the drawing, the inducer 19 formed at the upper plate 14 of the first stator 10 and the inducer 22 formed at the upper plate 15 of the second stator 11 are formed apart from each other by a mechanical angle θ. In the case of converting the mechanical angle into an electrical angle, the above two inducers 19 and 22 are formed to have a phase difference of 90°.

In step motor 1 having the above-identified structure, it is assumed that the phase of the excitation state of the first coil 17 is A, and the phase of the excitation state of the second coil 18 is B. In this case, the torques A+B, A−B, −(A+B) and −(A−B) generated by exciting each of the phases through a control unit is indicated as in FIG. 4. FIG. 5 illustrates the torques in vector form.

Figure 4:
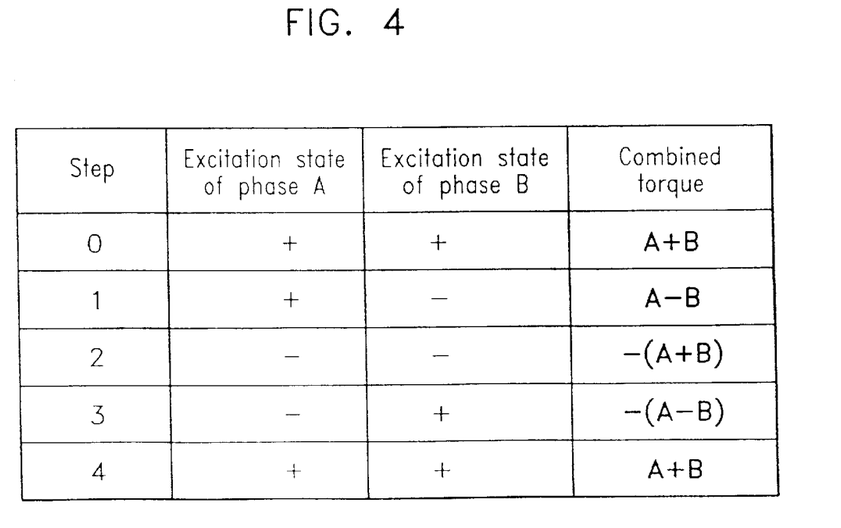
FIG. 4 is a table illustrating excitation states of each phase.
Figure 5:
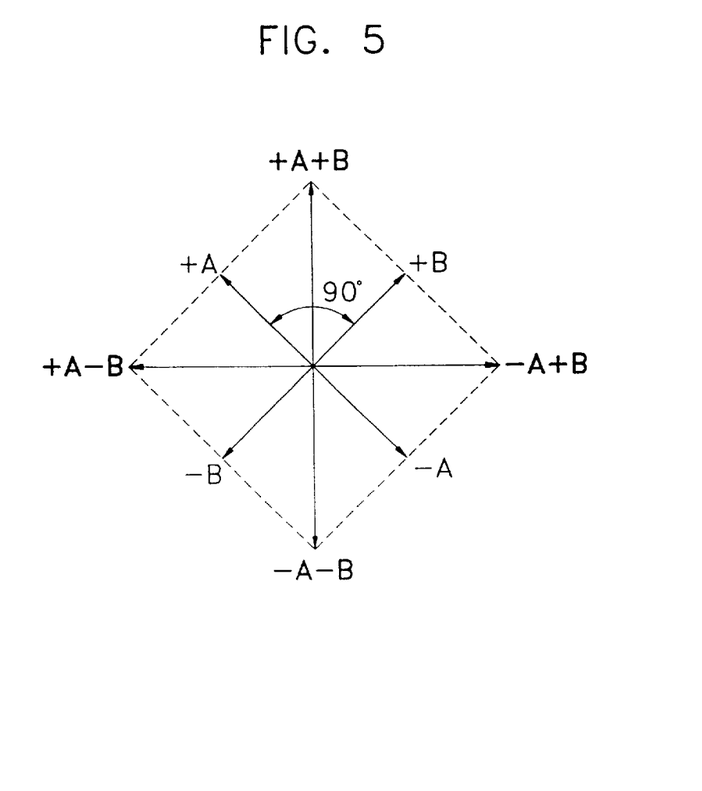
FIG. 5 is a vector view illustrating the excitation states of each phase.

Referring to FIGS. 4 and 5, + (plus) and − (minus) signs indicate the rotating direction of the rotor 12. In other words, + indicates clockwise, and − indicates counterclockwise. Ideally, phases A and B are designed to have a phase difference of 90°. However, when problems in assembling or manufacturing the step motor cause the phase difference to vary from 90° (i.e., the step angle is not accurately 90°), the torques applied to each step are uneven and the distance between each step as determined by each torque becomes uneven. Especially, when the problems are generated in the acceleration section, the positions where the printing operation is initially performed become different in each line.

Figure 6:
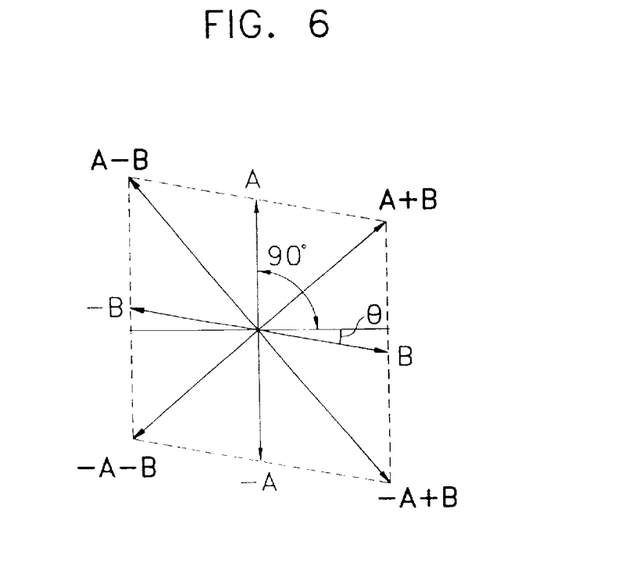
FIG. 6 is a vector view illustrating the case wherein the phase difference of each phase does not maintain 90° in the step motor.

FIG. 6 is a vector view illustrating the torque when the phase difference is not exactly 90° in the step motor.

When the phases A and B have a phase difference of more than 90° (i.e., 90°+θ), the combined torque vectors A+B, −A+B, −A+B and A−B are not matched to each other. In other words, the amplitude of sum of vectors is as follows:

$$|A+B| \leq |A-B|$$

As shown in the above formula, when the signs of the two vectors are different, the sum of the vectors is greater than the sum of the vectors which have the same sign.

Figure 7A:
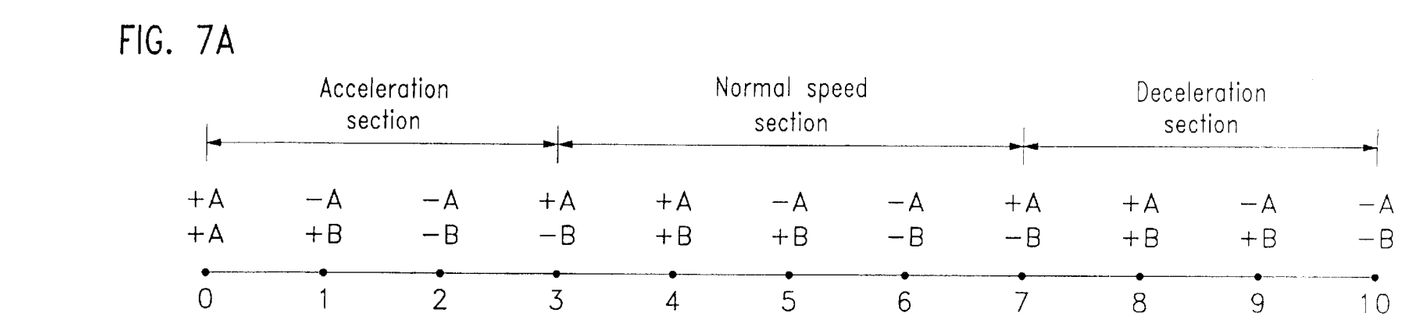
FIG. 7 is a view illustrating the difference between each step.
Figure 7B:
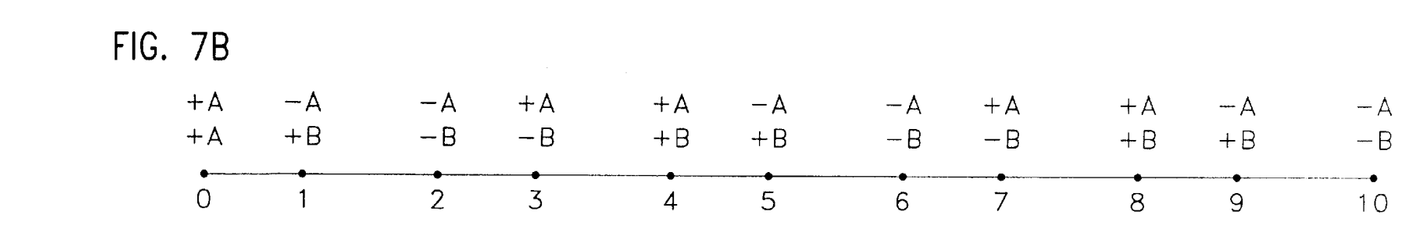

Assume that the printing operation in a first line starts at a stop phase torque vector A+B. First, acceleration occurs during three steps. Then, the printing operation starts in the uniform speed period and is performed in four steps. Subsequently, deceleration occurs during three steps, and then the printing operation stops. At this time, when the phase difference is exactly 90° and the torques which are generated in each phase are the same, the traveling distances between each step are as indicated in FIG. 7A. However, when the phase difference is greater than 90°, the traveling distances are as indicated in FIG. 7B. When excitations having the same sign are generated in phases A and B, a small torque is generated. Conversely, when excitations having different signs are generated in phases A and B, a large torque is generated.

Figure 7C:
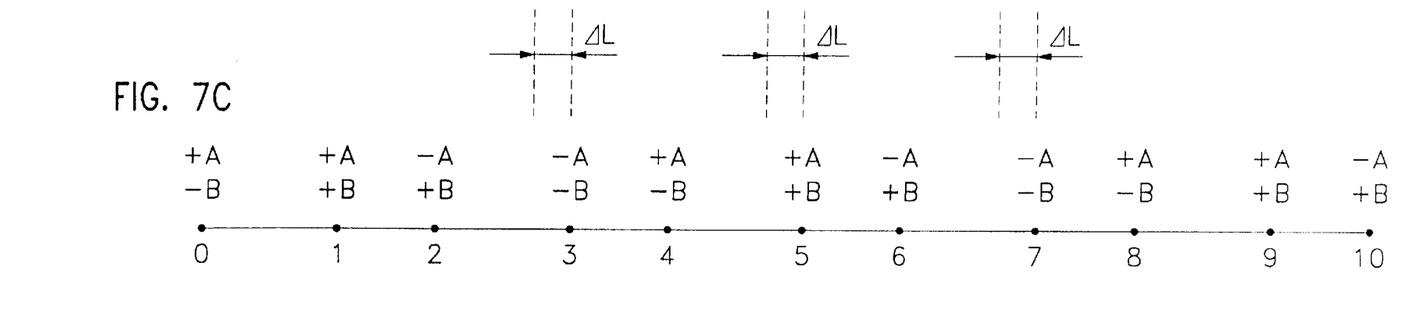

As shown in FIGS. 7B and 7C, when one line is printed in eleven steps, since the final phase is completed with −A−B, the first phase of the next line is +A+B. Accordingly, the traveling distance in the acceleration section becomes different in the first and second lines. As a result, in the case of a unidirectional printing operation, the start position of the uniform speed period becomes different by ΔL. Similarly, when performing bidirectional printing, the latter difference can also occur.

Figure 8:
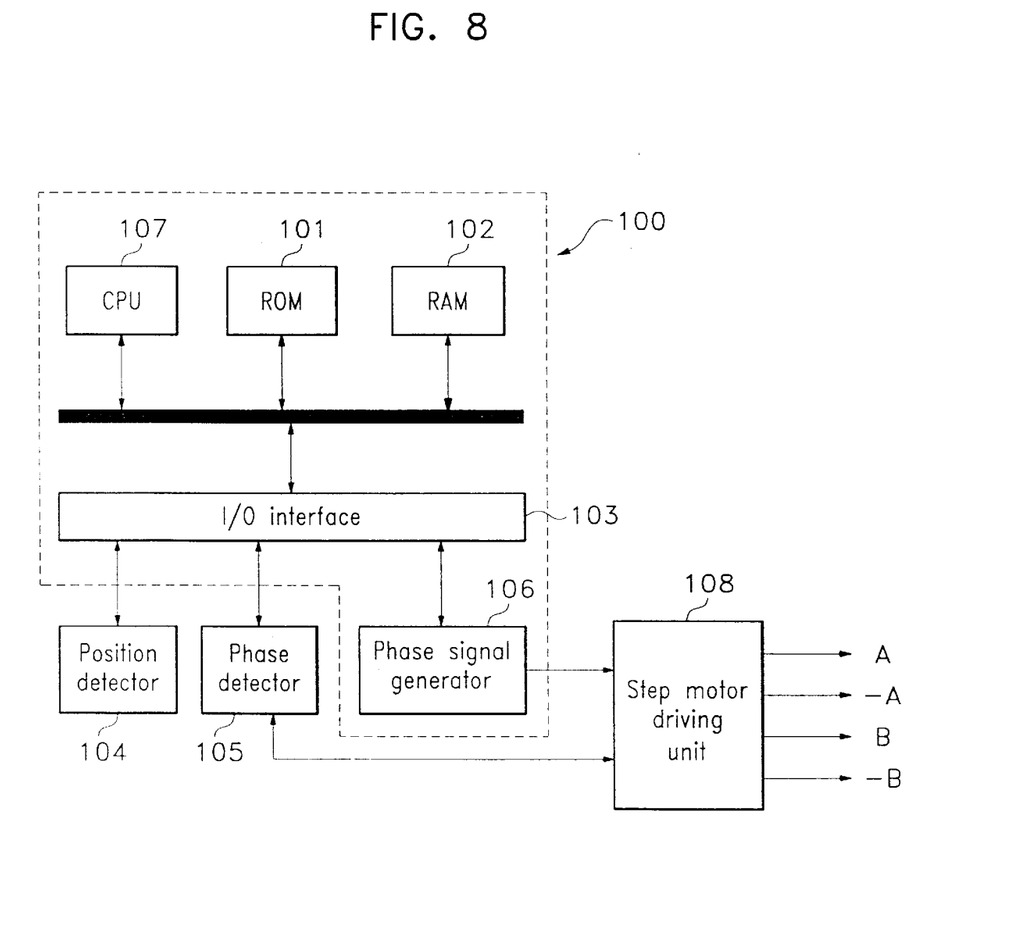
FIG. 8 is a block diagram illustrating a preferred embodiment of the present invention.

FIG. 8 is a block diagram illustrating one embodiment of the present invention. As shown therein, a step motor control unit 100 includes: a central processing unit 107; a read-only memory (ROM) 101 for storing data and a control program for controlling the central processing unit 107 and a target (or intended or desired) movement of a step of the step motor; a random access memory (RAM) 102 for temporarily storing data for input/output to/from the central processing unit 107; an input/output interface 103 for exchanging data between the central processing unit 107 and its peripheral devices; and a phase signal generator 106 for generating a specific pulse inputted by the input/output interface 103 and a stepping pulse for determining the rotating direction of the motor.

A position detector 104 detects the present position of the step motor which is driven or stopped, and transmits data to the central processing unit 107 through the input/output interface 103. The central processing unit 107 determines whether the step motor has arrived at a target amount by continuously comparing position detection data from detector 104 with target movement data stored in the ROM 101.

A step motor driving unit 108 allows phases A and B to be excited in the order of A+B, −A+B, −A−B and A−B, according to a pulse signal from the phase signal generator 106, the pulse signal being generated according to a pulse command signal which is inputted from the central processing unit 107 through the input/output interface 103.

In addition, a phase detector 105 detects the phase currently excited from the excitation phase of the step motor driving unit 108, and transmits data as to the phase currently excited to the central processing unit 107 through the input/output interface 103.

When it is determined that the step motor has arrived at the target amount, the central processing unit 107 detects the present excitation state transmitted from the phase detector 105, and detects whether the excitation state is a specific phase stored in the ROM 101. When the excitation state is in a specific phase, a stop command signal is transmitted to the phase signal generator 106 so that the step motor driving unit 108 cannot excite each phase. When the excitation state is not in the specific phase, the control command for stopping the step motor is transmitted. That is, when the step motor rotates clockwise, it stops after moving by one step in the forward direction. When the step motor rotates counterclockwise, it stops after moving by one step in the backward direction.

When the excitation state is unevenly distributed, the torque generated by the excited coil becomes greater when the signs of the two phases are different than when they are the same, as shown in the previously stated formula: $|A+B| \leq |A-B|$. Accordingly, in order to increase the starting torque, the starting phase of each line is set to have the phase 'A−B' or '−B+A' which have different signs. On the contrary, in the case of deceleration, the final stop phase is set to have phases 'A+B' or '−A−B' which have a small torque.

The position detector 104 calculates the position of the step motor 108 after the starting position is fixed to zero and the present position is processed by software, such as a program for adding the number of pulses applied to the step motor. Similarly, the phase detector 105 fixes the signals with initial phases of each line and fully obtains the phases by means of software using the number of pulses applied to the step motor.

The target movement and start and stop phases of each line are stored in the ROM 101. When the position detected by the position detector 104 corresponds to the target movement, the central processing unit 107 disables the phase signal generator 106 from generating more pulses. Subsequently, the central processing unit 107 receives the excitation state of the present position from the phase signal data inputted by the phase detector 105, and compares it with the stop phase stored in the ROM 101. When the detected excitation state matches the stop phase stored in the ROM 101, the central processing unit 107 supplies a pulse control signal to the phase signal generator 106 so as to generate a pulse corresponding to a signal of the excitation state of a next step for a next line. However, when the detected excitation state does not match the stop phase stored in the ROM 101, the central processing unit 107 generates an excitation state after the next one by skipping over the next excitation state as the starting phase for the next line in the signal generator 106, thereby matching the excitation state when starting. In other words, during excitation in the order of (A+B), (−A+B), (−A−B), (A−B), . . . , when the excitation state stops in the state of (−A+B) which is different from the stop phase stored in the ROM 101, the central processing unit 107 enables the phase signal generator 106 to generate the excitation state of (A−B), skipping over the next order (−A−B) and, thereby, maintaining a proper starting phase.

Moreover, when the step motor stops during its clockwise rotation, it is possible to control the starting phase as described. Conversely, when the step motor stops during its counterclockwise rotation, it is possible to perform a bidirectional printing operation by exciting the phase of (−A+B), which is the next order in the reverse direction.

Figure 9:
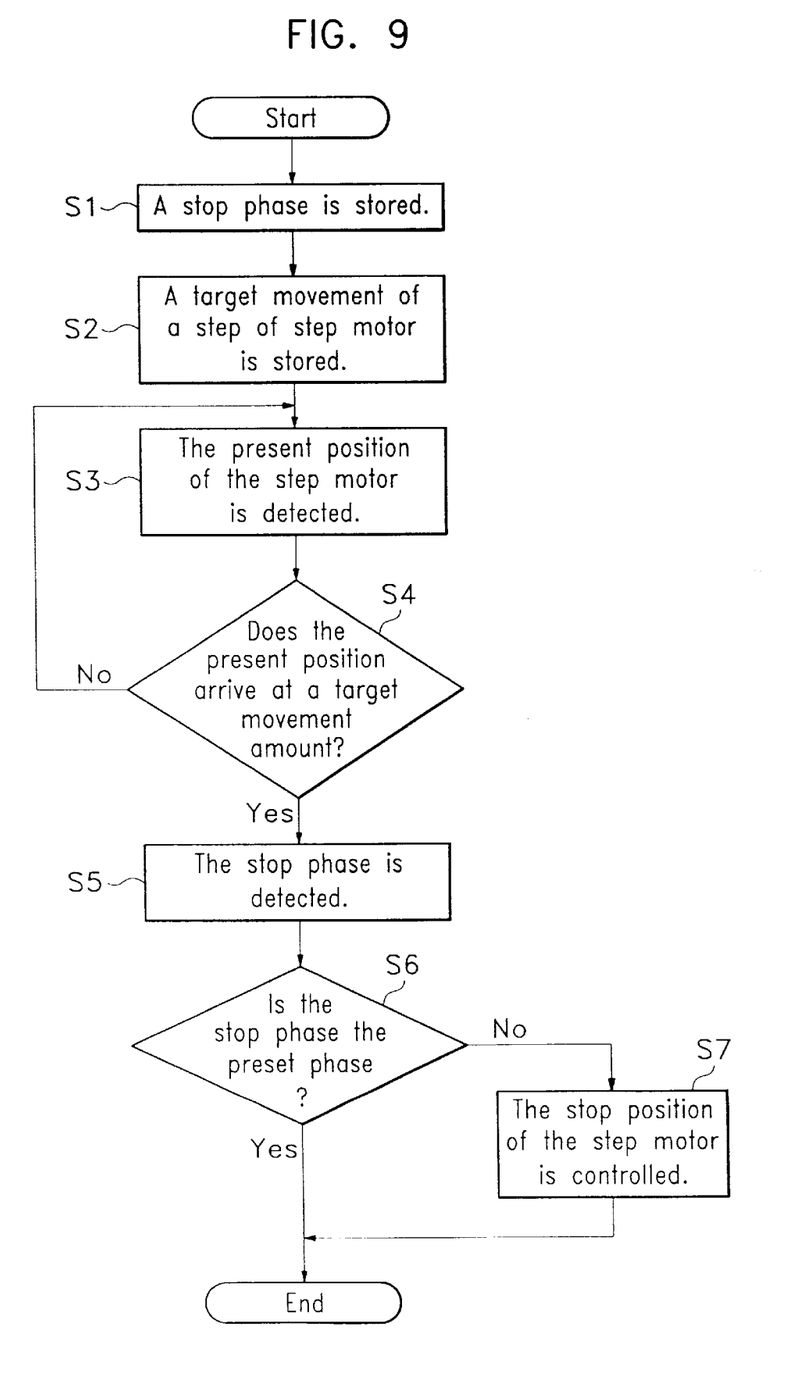
FIG. 9 is a flowchart illustrating a process of the present invention.

FIG. 9 is a flowchart illustrating the process of the present invention.

Various data used in the program and used for control are stored in the ROM 101. Especially, when the step motor decelerates and stops, the preferred excitation states of each phase are stored in the ROM 101 (step S1).

In addition, the target amount to be moved by the step motor is stored in the ROM 101 (step S2).

The present position of the step motor is detected by the position detector 104 (step S3), and it is transmitted to the central processing unit 107. The central processing unit 107 determines whether the present position has arrived at the target value by comparing position detection data with the target amount stored in the ROM 101 (step S4). When it is determined that the step motor has arrived at the target amount, the central processing unit 107 detects the stop phase from the phase detector 105 (step S5) and then compares it with the stop phase stored in the ROM 101 (step S6). When the detected phase does not match the stop phase, the stop position of the step motor is controlled by increasing or decreasing the target amount of the step motor by one step (step 7). At this time, the step motor can increase or decrease according to the rotating direction of the step motor.

As described above, according to the present invention, the step motor used as a power unit in a printer which requires minute control can actually decrease the error occurring due to the manufacturing process. Especially, by causing the same torque per unit of line in the acceleration and deceleration sections, the error of the step angle occurring in the manufacturing process can be minimized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A system for controlling a step motor which obtains a driving torque by exciting a plurality of phases, comprising:
   a position detector for detecting a position of said step motor;
   a phase detector for detecting an excitation state of said step motor;
   a step motor control unit for generating a driving signal to control start and stop operations of said step motor to be performed in specific phases based on the position of said step motor as detected by said position detector and the excitation state as detected by said phase detector; and
   a step motor driving unit for driving said step motor in response to said driving signal generated by said step motor control unit;
   wherein said step motor control unit comprises:
   a read-only memory (ROM) for storing a control program, specific excitation states of said step motor, and a target movement of a step of said step motor;
   a central processing unit which detects a stop position by comparing position detection data of said position detector with the target movement of the step stored in said ROM, detects a phase of the stop position from said phase detector, and generates a control signal; and
   a phase signal generator for providing a driving pulse to said step motor driving unit in response to the control signal from said central processing unit.

2. The system of claim 1, wherein said step motor control unit generates the control signal for controlling said target movement when the excitation state of the stop position and the phase of the stop position stored in said ROM match each other.

3. The system of claim 1, wherein said control signal moves the step motor forward per unit of step in a moving direction of said step motor.

4. The system of claim 1, wherein said step motor is a two-phase step motor which is designed to have a phase difference of 90°, and has a large starting torque at a start time by setting specific excitation states of two phases to have a same sign at a stop time and to have different signs at the start time.

5. The system of claim 1, wherein said step motor control unit generates the control signal for driving said step motor driving unit so as to achieve an excitation state after a next excitation state by skipping over the next excitation state as a starting phase when an excitation state of the stop position and a phase of the stop position stored in said ROM do not match each other.

6. A method for controlling a step motor which is excited to a plurality of phases, comprising the steps of:

storing a target movement of a step of said step motor and preferred excitation states of each of said plurality of phases for a start time and a stop time;

detecting the stop time of said step motor and comparing an excitation state of the stop time with the stored excitation states of each of said plurality of phases for the stop time; and controlling said target movement of the step when said compared excitation states do not match each other.

7. The method of claim 6, wherein said step motor is a two-phase step motor which is designed to have a phase difference of 90°, and has a large starting torque in a start time by setting the preferred excitation states of two phases to have a same sign in the stop time and to have different signs in the start time.

8. The method of claim 6, wherein, said step of controlling the target movement comprises performing a controlling operation per unit of step in the moving direction of said step motor.

9. A system for controlling a step motor, comprising:

position detector means for detecting a position of said step motor;

phase detector means for detecting an excitation state of said step motor;

step motor control means for generating a driving signal to control start and stop operations of said step motor to be performed in specific phases based on the position of said step motor as detected by said position detector means and the excitation state detected by said phase detector means; and step motor driving means for driving said step motor in response to the driving signal of said step motor control means;

wherein said step motor control means generates a control signal which moves said step motor per unit of step in a moving direction of said step motor.

10. The system of claim 9, wherein said step motor control means comprises:

a read-only memory (ROM) for storing a control program, specific excitation states of said step motor, and a target movement of a step of said step motor;

a central processing unit which detects a stop position by comparing position detection data of said position detector means with the target movement of the step stored in said ROM, and which generates the control signal; and a phase signal generator for providing a driving pulse to said step motor driving means in response to the control signal of said central processing unit.

11. The system of claim 9, wherein said step motor control means comprises:

a read-only memory (ROM) for storing a control program, specific excitation states of said step motor, and a target movement of a step of said step motor;

a central processing unit which detects a phase of the stop position from said phase detector means, and which generates the control signal; and a phase signal generator for providing a driving pulse to said step motor driving means in response to the control signal of said central processing unit.

12. The system of claim 9, wherein said step motor control means comprises:

a read-only memory (ROM) for storing a control program, specific excitation states of said step motor, and a target movement of a step of said step motor;

a central processing unit which generates the control signal for controlling said target movement when an excitation state of the stop position and a phase of the stop position stored in said ROM do not match each other; and a phase signal generator for providing a driving pulse to said step motor driving means in response to the control signal of said central processing unit.

13. The system of claim 9, wherein said step motor is a two-phase step motor which is designed to have a phase difference of 90°, and has a large starting torque at a start time by setting specific excitation states of two phases to have a same sign at a stop time and to have different signs at the start time.

14. The system of claim 9, wherein said step motor control means comprises:

a read-only memory (ROM) for storing a control program, specific excitation states of said step motor, and a target movement of a step of said step motor;

a central processing unit which generates the control signal for driving said step motor driving unit so as to achieve an excitation state after a next excitation state by skipping over the next excitation state as a starting phase when an excitation state of the stop position and a phase of the stop position stored in said ROM do not match each other; and a phase signal generator for providing a driving pulse to said step motor driving unit in response to the control signal from said central processing unit.

15. A method for controlling a step motor, comprising the steps of:

(a) detecting a present position of said step motor;

(b) comparing the present position of said step motor with a target movement of a step of said step motor;

(c) when the present position of said step motor coincides with the target movement of a step of said step motor, detecting a stop phase of said step motor;

(d) comparing the detected stop phase with a predetermined stop phase; and (e) when the detected stop phase coincides with the predetermined stop phase, ending the method.

16. The method of claim 15, further comprising the step of storing the target movement of a step of said motor and the predetermined stop phase in a memory.

17. The method of claim 15, further comprising the step, after step (b) of returning to step (a) when the present position of said step motor does not coincide with the target movement of a step of said step motor.

18. The method of claim 15, further comprising the step, after step (d), of controlling the stop position of the step motor when the detected stop phase does not coincide with the predetermined stop phase.

19. An apparatus for controlling a step motor, comprising:

means for detecting a present position of said step motor;

means for comparing the present position of said step motor with a target movement of a step of said step motor;

means responsive to the present position of said step motor coinciding with the target movement of a step of said step motor for detecting a stop phase of said step motor;

means for comparing the detected stop phase with a predetermined stop phase; and means responsive to the detected stop phase coinciding with the predetermined stop phase for ending control of the step motor.

20. The apparatus of claim 19, further comprising memory means for storing the target movement of the step of said motor and the predetermined stop phase.

21. The apparatus of claim 19, wherein said detecting means detects the present position of said step motor when the present position of said step motor does not coincide with the target movement of the step of said step motor.

22. The apparatus of claim 19, further comprising means for controlling the stop position of the step motor when the detected stop phase does not coincide with the predetermined stop phase.

* * * * *